(12) United States Patent
Bao

(10) Patent No.: US 6,848,561 B2
(45) Date of Patent: Feb. 1, 2005

(54) INTEGRATED CURRENCY VALIDATOR

(76) Inventor: Dong-Shan Bao, 41043 Janice St., Fremont, CA (US) 94539

( * ) Notice: Subject to any disclaimer, the term of this patent is extended or adjusted under 35 U.S.C. 154(b) by 174 days.

(21) Appl. No.: 10/377,334

(22) Filed: Feb. 27, 2003

(65) Prior Publication Data

US 2003/0178282 A1 Sep. 25, 2003

(30) Foreign Application Priority Data

Mar. 25, 2002 (CN) .................................. 02 1 04493 A

(51) Int. Cl.[7] .............................................. G07D 7/20
(52) U.S. Cl. ....................................... 194/207; 194/302
(58) Field of Search ................................ 194/207, 215, 194/216, 302; 250/548, 550, 559.01, 559.04; 209/534

(56) References Cited

U.S. PATENT DOCUMENTS

| | | | |
|---|---|---|---|
| 3,782,543 A | * 1/1974 | Martelli et al. | ............. 209/555 |
| 6,073,744 A | 6/2000 | Raterman et al. | ............ 194/207 |
| 6,104,036 A | * 8/2000 | Mazowiesky | ............... 250/556 |
| 2001/0030100 A1 | 10/2001 | Negishi | |
| 2002/0109830 A1 | 8/2002 | Liu | |

FOREIGN PATENT DOCUMENTS

WO    WO 91/03031    * 3/1991    ............ G07D/7/00

OTHER PUBLICATIONS

"How does a dollar bill changer work?", Howstuffworks, downloaded from http://www.howstuffworks.com/question269.htm, on Jan. 16, 2003, 4 pages.

* cited by examiner

Primary Examiner—Donald P. Walsh
Assistant Examiner—Mark Beauchaine
(74) Attorney, Agent, or Firm—Patent Law Group LLP; David C. Hsia

(57) ABSTRACT

A currency validator includes a currency counter, a plurality of cameras, an image processor, a comparing processor, and a threshold processor. The currency counter counts multiple currencies including a test currency. Each of the cameras is located at a unique angle from a characteristic area on the test currency. The cameras record and output multiple images of the characteristic area. The image processor crops and reduces the recorded images. The comparing processor compares the processed images with corresponding references. The comparing processor then outputs the results as error matrices. The threshold processor compares the error matrices with corresponding threshold matrices. The threshold processor then outputs a validation result for the tested currency based on the comparison.

12 Claims, 5 Drawing Sheets

INTEGRATED CURRENCY VALIDATOR

FIELD OF THE INVENTION

This invention relates to currency validators.

DESCRIPTION OF RELATED ART

These days, techniques against currency forgery fall into two main categories: special papers (including plastic paper), and anti-forgery plate making and printing. Currently, allochromatic ink and holography are the key printing techniques in producing the European currencies (known as "Euro"), the US currencies with large face values, and the new Chinese currencies (known as "RMBs"). These currencies are the most difficult to forge because errors are unavoidable no matter how great the effort in counterfeiting. For example, the imitation of allochromatic ink is extremely difficult because not all of the allochromatic effects at all angles can be reproduced even by electronic color matching techniques. Presently available currency validation techniques identify optical images in a currency mainly by human eyes or with the aid of optical or chemical methods (e.g., a chemical pen that identifies allochromatic ink). Essentially, these techniques identify optical images. Compared to digital image processing techniques in signal processing, they are much inferior in accuracy and result, and they cannot be done continuously and automatically. Thus, what are needed are currency validation method and apparatus that address these disadvantages.

SUMMARY

In one embodiment of the invention, a currency validator includes a currency counter, a plurality of cameras, an image processor, a comparing processor, and a threshold processor. The currency counter counts multiple currencies including a test currency. Each of the cameras is located at a unique angle from a characteristic area on the test currency. The cameras record and output multiple images of the characteristic area. The image processor crops and reduces the recorded images. The comparing processor compares the processed images with corresponding references. The comparing processor then outputs the results as error matrices. The threshold processor compares the error matrices with corresponding threshold matrices. The threshold processor then outputs a validation result for the tested currency based on the comparison.

DETAILED DESCRIPTION

The invention provides a currency validator that accurately determines the authenticity of the currency tested by integrating various techniques and technologies.

Figure 1:
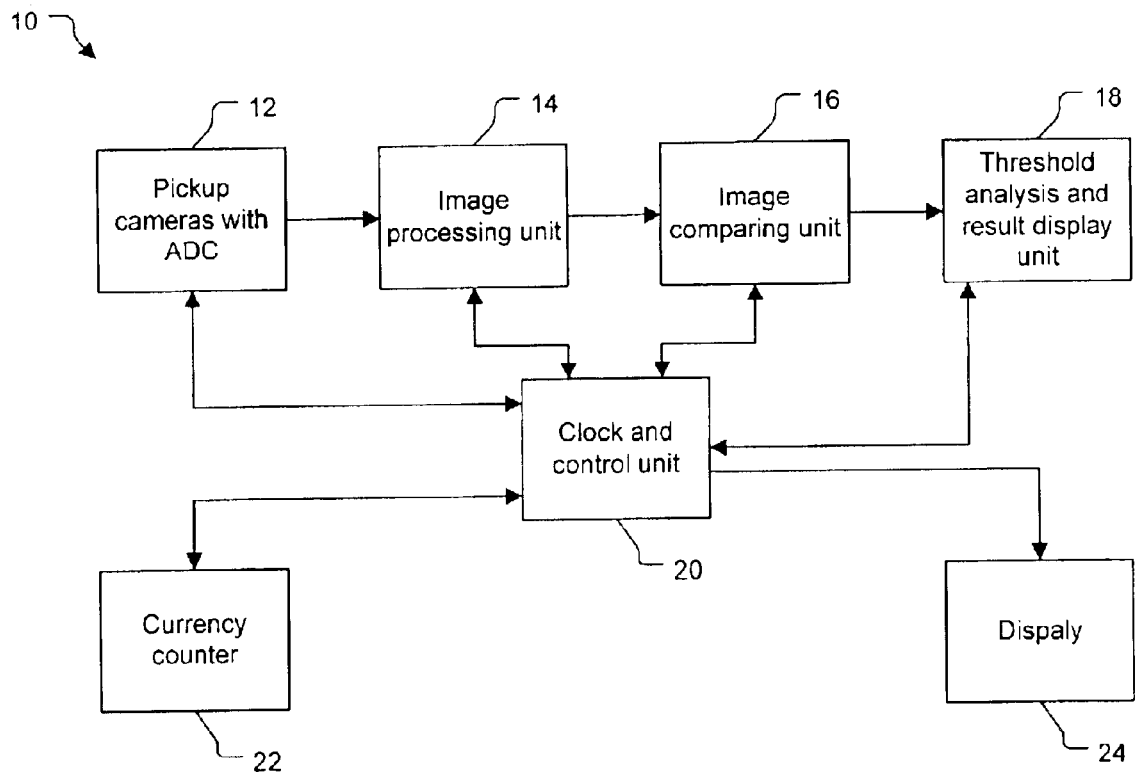
FIG. 1 is a block diagram of an integrated currency validator in one embodiment of the invention.

FIG. 1 is a block diagram of a currency validator 10 in one embodiment of the invention. Currency validator 10 includes a digital camera unit 12, an image processing unit 14, an image comparing unit 16, a threshold analysis unit 18, a clock and control unit 20, a currency counter 22, and a display 24.

Figure 2:
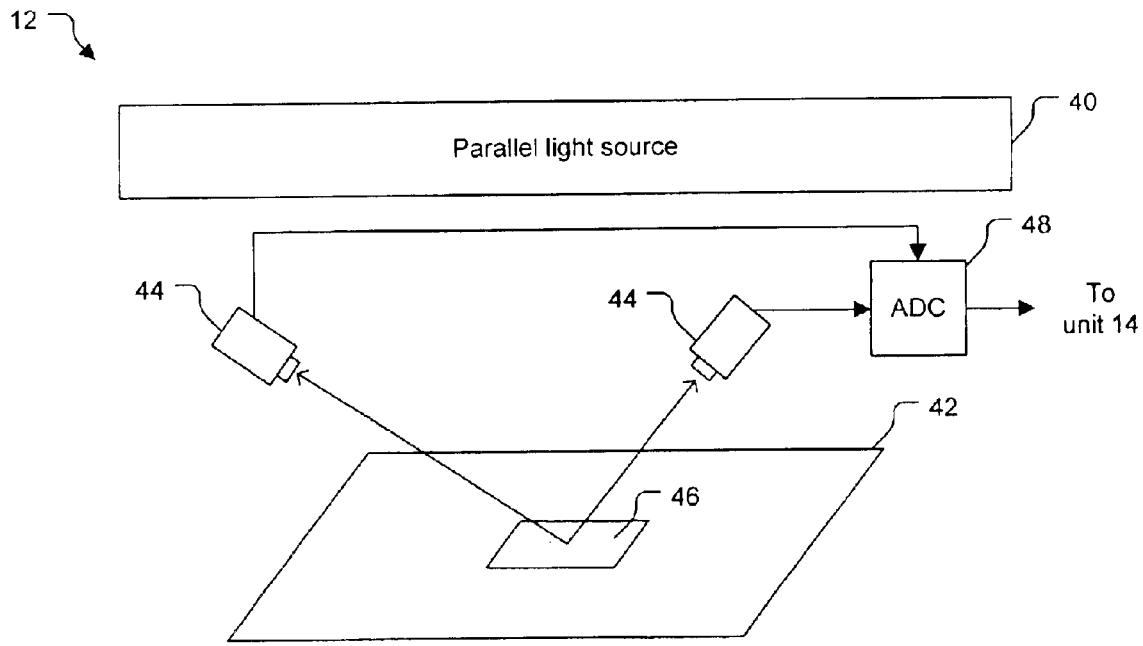
FIG. 2 is a block diagram of a digital camera unit in the validator of FIG. 1 in one embodiment of the invention.

FIG. 2 illustrates one embodiment of digital camera unit 12. Unit 12 includes a parallel light source 40 that illuminates a currency 42 that is being validated. Two or more digital cameras 44 record images of a characteristic area 46 on currency 42 at different angles. Characteristic area 46 contains one or more holographic images, allochromatic inks, or a combination thereof. Thus, cameras 44 record the unique optical properties (e.g., change in image, color, or a combination thereof) of characteristic area 46 at different angles. Additional digital cameras 44 can be added to record images of additional characteristic areas on currency 42, or the same characteristic area at additional angels. Digital cameras 44 output the recorded images to an analog-to-digital converter (ADC) 48. ADC 48 converts the recorded images into digital images (e.g., RGB signals). ADC 48 then outputs the digital images to image processing unit 14.

Figure 3:
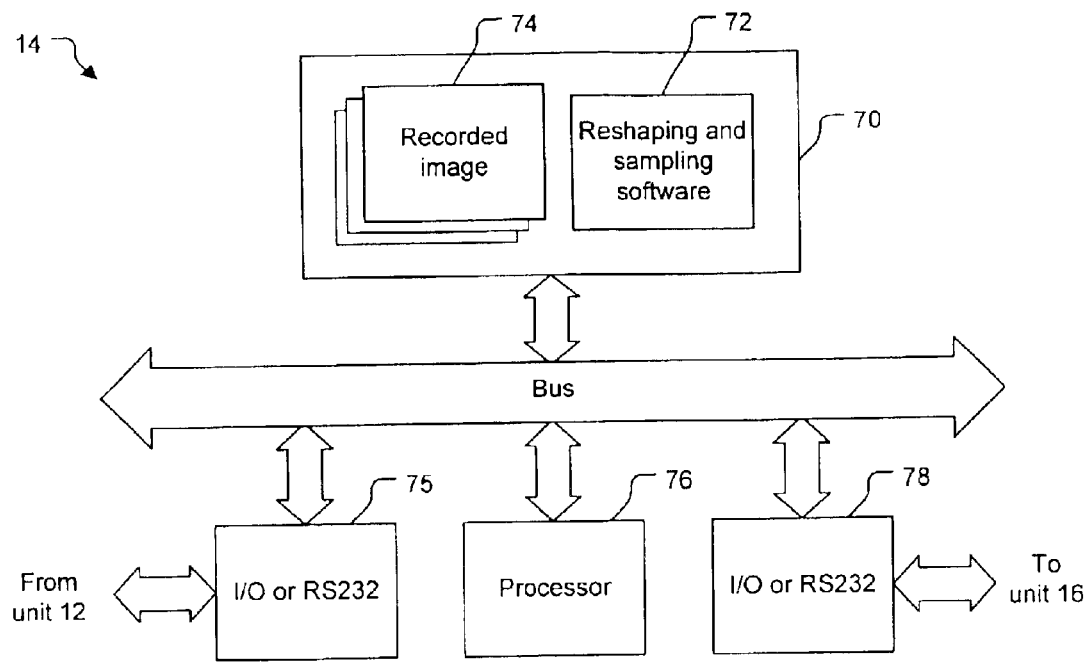
FIG. 3 is a block diagram of an image processing unit in the validator of FIG. 1 in one embodiment of the invention.

FIG. 3 illustrates one embodiment of image processing unit 14. Unit 14 includes a memory 70 (e.g., a random access memory (RAM)) that caches (1) an image processing software 72, and (2) one or more recorded images 74 received from unit 12 via an I/O port 75 (e.g., RS232 or USB interface).

Figure 3A:
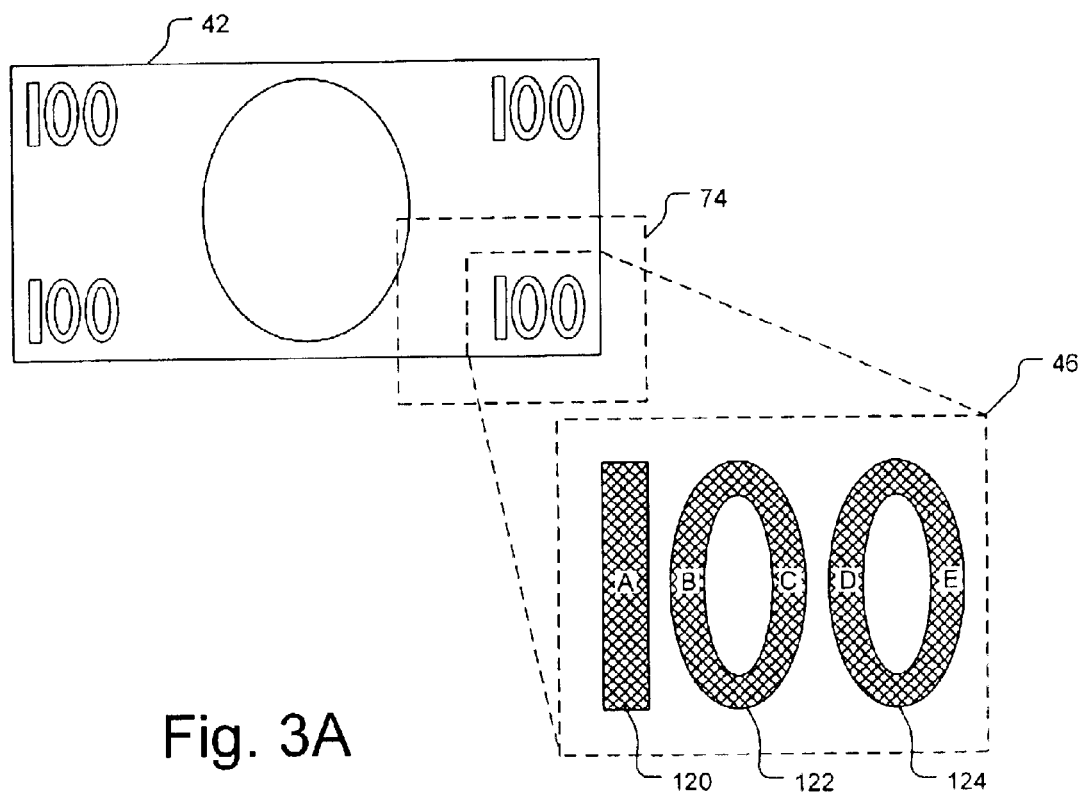
FIG. 3A is an image of a currency having a characteristic area in one embodiment of the invention.

A processor 76 executes software 72 to process recorded images 74. As illustrated in FIG. 3A, processor 76 crops unnecessary areas in a recorded image 74 and leaves behind characteristic area 46 of currency 42. Prior to cropping, processor 76 may need to reposition recorded image 74 (e.g., by translation and/or rotation) to properly capture characteristic area 46. Processor 76 then reduces recorded image 74 to a resolution specific to the face value of the currency. The face value of the currency is provided by an operator to validator 10. For example, processor 76 crops the ¥ 100 RMB from a resolution of 164×220 pixels (36,000 pixels) to a resolution of 81×181 pixels, and then reduces it to a resolution of 41×91 pixels. Processor 76 sends the processed images to image comparing unit 16 via an I/O port 78.

Figure 4:
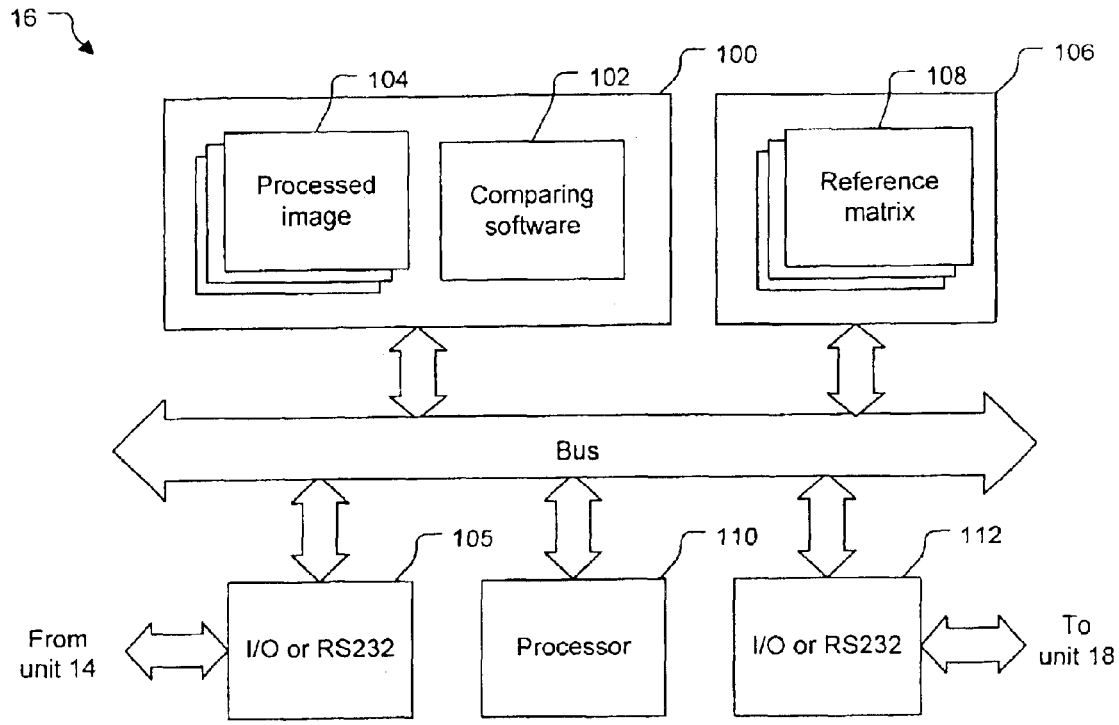
FIG. 4 is a block diagram of an image comparing unit in the validator of FIG. 1 in one embodiment of the invention.

FIG. 4 illustrates one embodiment of image comparing unit 16. Unit 16 includes a memory (e.g., a RAM) 100 that caches (1) a comparing software 102, and (2) one or more processed images 104 received from unit 14 via an I/O port 105. Unit 16 also includes a memory 106 (e.g., a read only memory (ROM)) that stores one or more references matrices 108. Each reference matrix is specific to a currency face value, a characteristic area on the currency, an angle at which the characteristic area is captured, and a specific element of the characteristic area (described hereafter).

A processor 110 executes software 102 to compare a processed image 104 to reference matrices 108. In one embodiment, processor 110 determines the monochrome brightness of the pixels that make up the outline of holographic or allochromatic designs 120, 122, and 124 (FIG. 3A). Software 102 saves the monochrome brightness in one matrix. Processor 110 also determines the RGB values of pixels A, B, C, D, and E (FIG. 3A) in designs 120, 122, and 124. Software 102 saves the RGB values in five corresponding matrices. These matrices reflect the color characteristics of pixels A, B, C, D, and E.

Processor 110 then calculates the differences between the monochrome and the RGB matrices of currency 42 and those of an authentic currency (i.e., reference matrices 108). Reference matrices 108 are determined in the same way as the monochrome and the RGB matrices of the currency 42 described above. Processor 110 stores the differences in six error matrices. Processor 110 sends the six error matrices to threshold analysis unit 18 via an I/O port 112.

Figure 5:
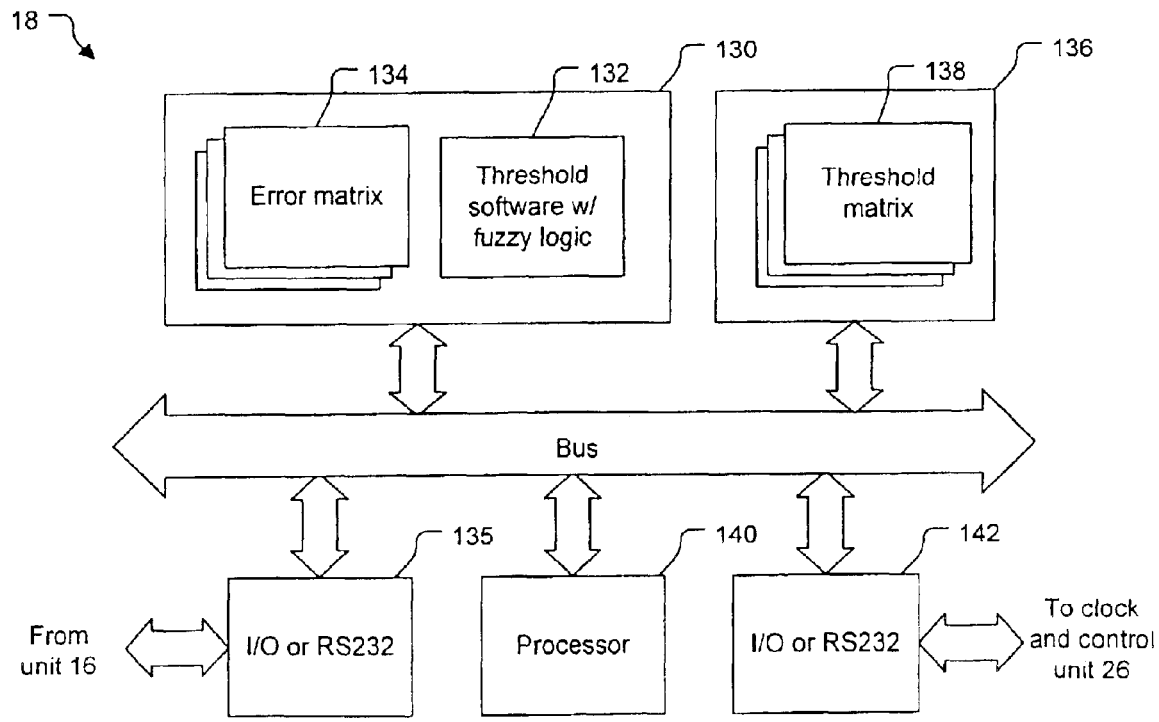
FIG. 5 is a block diagram of a threshold analysis unit in the validator of FIG. 1 in one embodiment of the invention.

FIG. 5 illustrates one embodiment of threshold analysis unit 18. Unit 18 includes a memory (e.g., a RAM) 130 that caches (1) a threshold software 132, and (2) one or more error matrices 134 received from unit 16 via an I/O port 135. Unit 18 also includes a memory 136 (e.g., a ROM) that stores one or more threshold matrices 138. Each threshold matrix is specific to a currency face value, a characteristic area on the currency, an angle at which the characteristic area is captured, and an element of the characteristic area.

A processor 140 executes software 132 to determine if the six error matrices meet the criteria of corresponding threshold matrices 138. Specifically, processor 140 determines if values in the error matrices are less than the corresponding values in threshold matrices 138. If so, currency 42 is a valid currency. Processor 110 outputs the result of the comparison to clock and control unit 20 via an I/O port 142.

In application, errors stemming from the position, flatness, and age of the currency, and the temperature and humidity of the environment, will generate a normal range of errors for the comparison performed above by unit 16. Furthermore, errors can stem from the handling of a currency by different people, such as a stain on the currency.

In one embodiment, software 132 can be implemented with fuzzy logic to accommodate the normal error range of the comparison. Software 132 includes a set of rules that determines if a currency is valid. Such a set of rules may judge a currency to be valid if most of the values in the six error matrices are less than the corresponding values in the threshold matrices. For example, if 55% of the monochrome brightness errors and 80% of RGB errors are less than the corresponding values in threshold matrices 138, then currency 42 is deemed valid. The exact rules will depend on a variety of factors, including the actual characteristics of the currency and the condition under which validator 10 operates. These rules can be experimentally determined and tailored to each application.

Referring back to FIG. 1, clock and control unit 20 is connected to units 12, 14, 16, 18, 22, and 24 through their I/O ports. Unit 20 synchronizes the operations of units 12, 14, 16, 18, 22, and 24. Unit 20 also receives the validation results from unit 18 and the counting result from currency counter 22. Clock and control unit 20 displays the count and validation results on display 24.

To count a stack of currencies, the stack is first put into a cash inlet of currency counter 22 in a first orientation for a first count. The orientation of the stack is then reversed and put back into the cash inlet for a recount to verify the count. Thus, a total counting time T must be less than a total validation time t to perform the validation of all the currencies.

Figure 6:
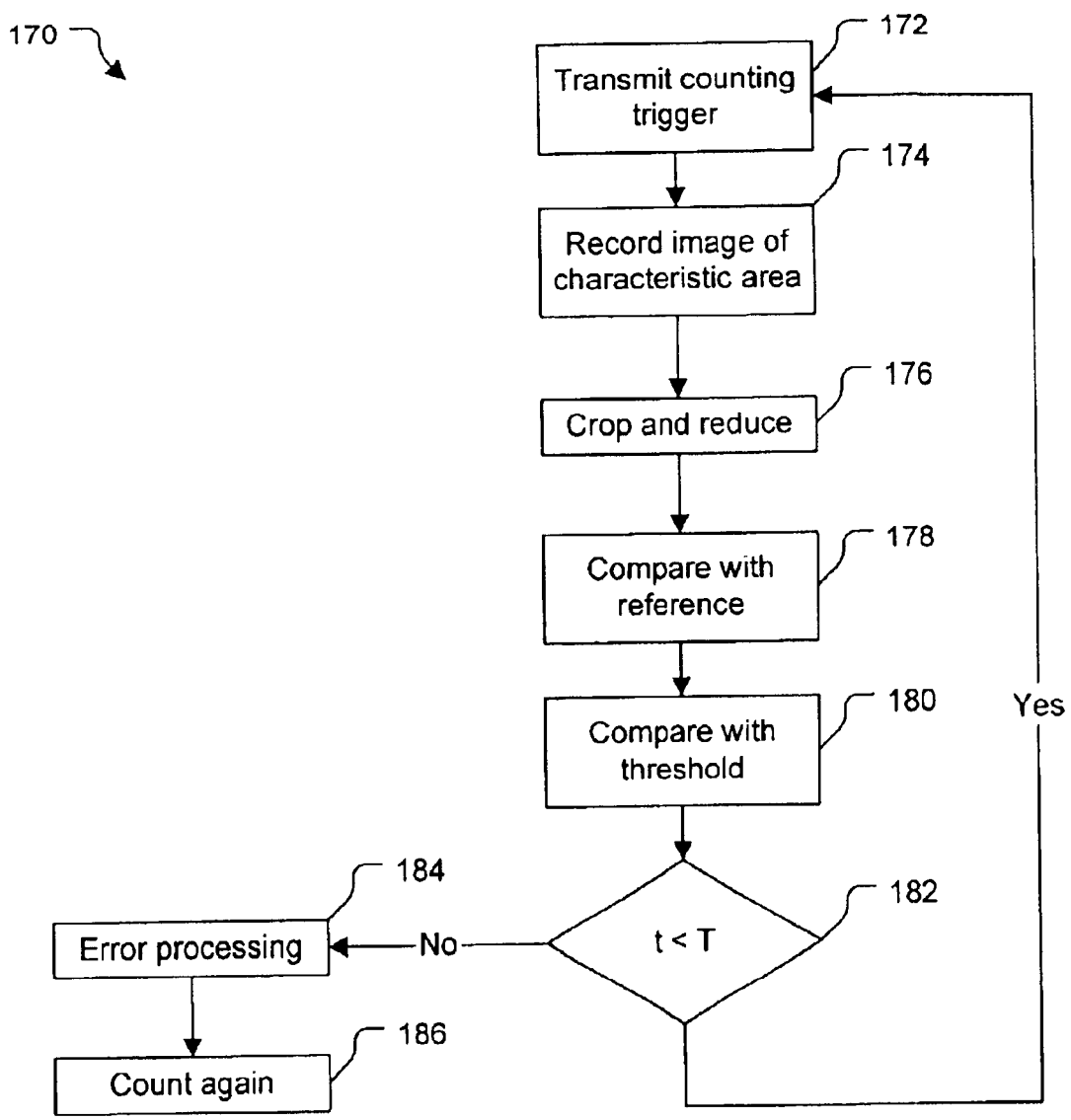
FIG. 6 is a flow chart of a method implemented by the validator of FIG. 1 to count and validate currencies in one embodiment of the invention.

FIG. 6 is a flow chart of a method 170 implemented by validator 10 to count and validate currencies in one embodiment. In step 172, currency counter 22 transmits a trigger signal to clock and control unit 20. The trigger signal indicates that a stack of currencies has been placed in the cash inlet and that one currency has been counted.

In step 174, digital camera unit 12 records images of characteristic area 46 (FIG. 2) on currency 42 from different angles.

In step 176, image processing unit 14 crops and reduces the recorded images to leave behind only characteristic area 46.

In step 178, image comparing unit 16 determines the differences between the monochrome brightness and RGB matrices of characteristic area 46 and their corresponding reference matrices. As described above, the reference matrices are specific to the currency face value, the characteristic area on the currency, the angle at which the characteristic area is captured, and the element of the characteristic area. Unit 16 outputs the result in error matrices.

In step 180, threshold analysis unit 18 determines if the error matrices are less than their corresponding threshold matrices. If so, then the tested currency is a valid currency. In one embodiment, threshold analysis unit 18 uses fuzzy logic to determine if the tested currency is valid as described above.

In step 182, clock and control unit 20 determines if time t to validate the tested currency is less than time T to count the tested currency. If so, then step 182 is followed by step 172 and the next currency is counted and tested. If time t is not less than time T, then step 182 is followed by step 184.

In step 184, clock and control unit 20 processes the error. An error can occur if a currency jams or is too old to be accurately validated. Thus, clock and control unit 20 stops validator 10 and waits for an operator to rearrange and then reinsert the currencies for a recount. The operator can take out any particular currency that is causing the error.

In step 186, clock and control unit 20 waits for currency counter 22 to restart the counting.

Figure 7:
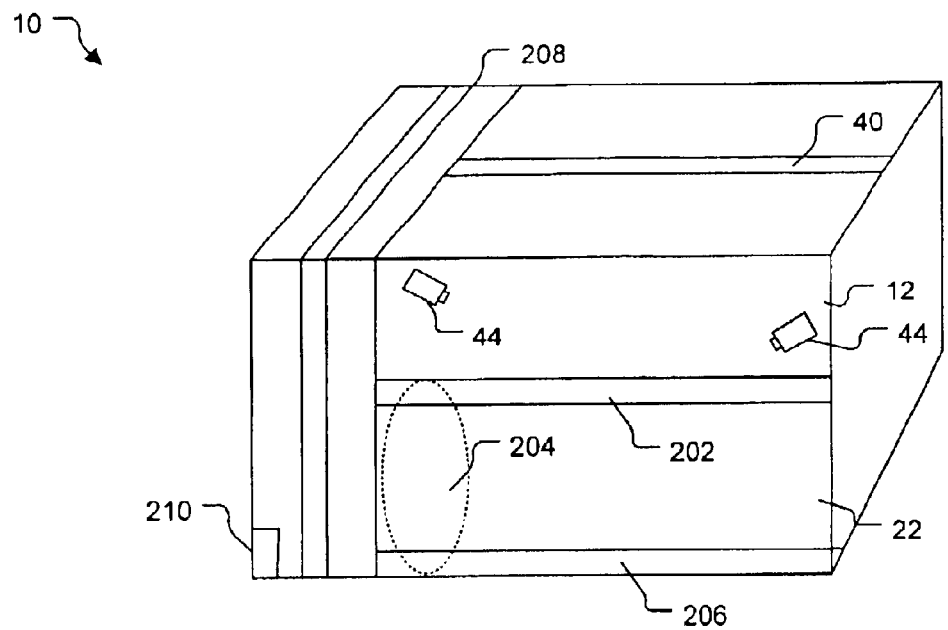
FIG. 7 is a schematic diagram of the validator in FIG. 1 in one embodiment of the invention.

FIG. 7 illustrates one embodiment of integrated currency validator 10. Validator 10 includes currency counter 22 having a currency inlet 202 for receiving the currencies, a mechanical driver 204 for counting the currencies, and a currency outlet 206 for dispensing the currencies after they are counted. Mounted above currency counter 22 is digital camera unit 12. As previously described, unit 12 includes parallel light source 40 illuminating currency 42 (FIG. 2), and digital cameras 44 for capturing images of characteristic area 46 (FIG. 2) on currency 42. Units 14, 16, and 18 (FIG. 2) are implemented on a circuit board 208. Validator 10 has an interface 210 for communication with clock and control unit 20.

Figure 8:
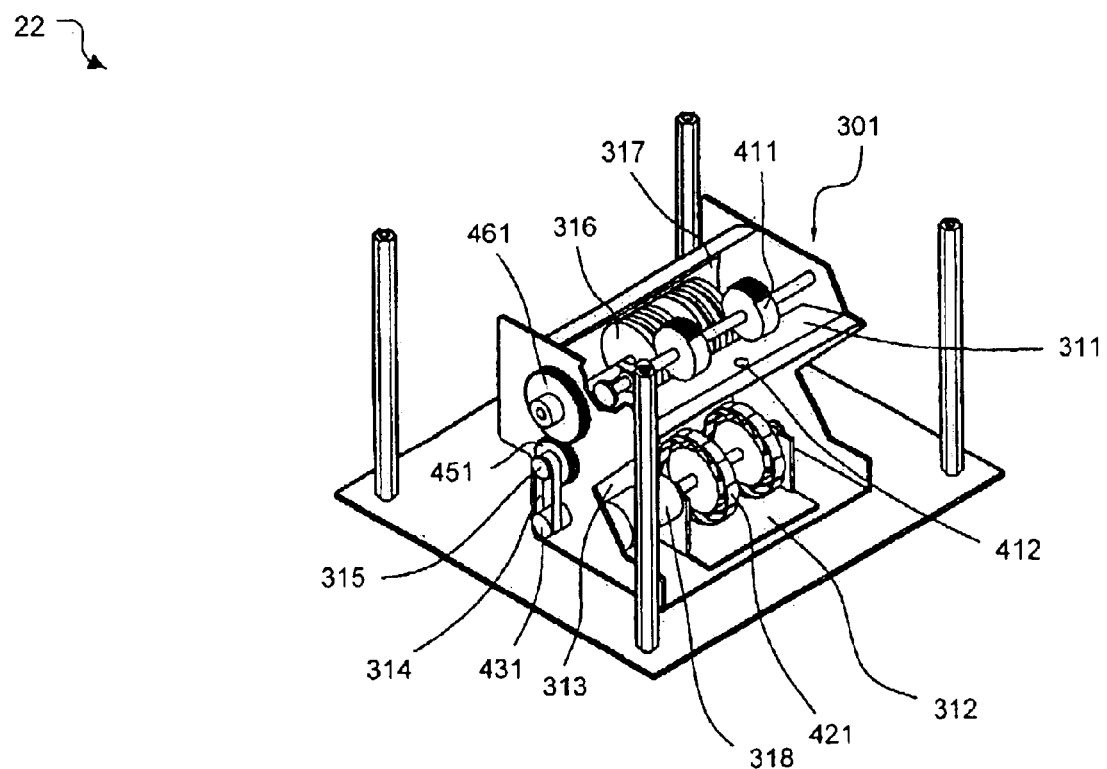
FIG. 8 is a schematic diagram of the currency counter in the validator of FIG. 1 in one embodiment of the invention.

FIG. 8 illustrates one embodiment of currency counter 22. Currency counter 22 includes a currency inlet 311 that receives the currencies and a cam 411 that guides the currencies. A gyro wheel 316 feeds the currencies below to an impeller 421. Gyro wheel 316 is connected to a first gear 461, which is turned by a second gear 451. Gear 451 has a first belt pulley 315 coupled to a second belt pulley 431 by a belt 314. Second belt pulley 431 is powered by a drive motor 313. Impeller 421 is powered by a drive motor 318. Impeller 421 feeds the currencies to a currency outlet 312.

A photoelectric sensor 412 outputs a counting signal each time a currency is detected (e.g., a currency is counted when a light beam is either interrupted or reflected back to its source). The counting signal of photoelectric device 412 also functions as the triggering signal for digital cameras 44 to take images of the currency. Digital cameras 44 are placed above currency inlet 311 to take images at one or more angles of the one or more characteristic areas on the currency being counted.

In one embodiment of the invention, each of units 14, 16, 18, and 20 is implemented with an Intel 586 processor operating at 133 MHz. Faster processing speeds can be obtained when processors with greater clock speeds are used with a trivial increase in cost. Furthermore, units 14, 16, 18, and 20 can be implemented together with a single computer having a processor with sufficient clock speed and memory (e.g., an Intel Pentium-IV processor operating at 2.2 GHz and RAM size exceeding 256 MB). Such a computer can be connected to units 12 and 22.

Various other adaptations and combinations of features of the embodiments disclosed are within the scope of the invention. Numerous embodiments are encompassed by the following claims.

What is claimed is:

1. A currency validator, comprising:
    a currency counter receiving a plurality of currencies including a test currency, the currency counter counting the currencies;
    a plurality of cameras, each camera being located at a different angle from an area on the test currency, the cameras outputting a plurality of images of the area;
    an image processing unit receiving the images from the cameras, the image processor outputting a plurality of processed images;
    an image comparing unit receiving the processed images, the comparing processor outputting a plurality of error matrices based on differences between characteristics of the processed images and characteristics of corresponding reference images; and
    a threshold analysis unit receiving the error matrices, the threshold processor outputting a validation result based on comparisons of the error matrices and corresponding threshold matrices.

2. The validator of claim 1, wherein the image processing unit comprises a memory caching the images from the cameras and software for processing the images.

3. The validator of claim 1, wherein the image comparing unit comprises:
    a first memory caching the processed images and software for comparing the characteristics of the processed images and the characteristics of the corresponding reference images; and
    a second memory storing the characteristics of the corresponding reference images.

4. The validator of claim 1, wherein the threshold analysis unit comprises:
    a first memory caching the error matrices and software for comparing the error matrices to the corresponding threshold matrices; and
    a second memory storing the corresponding threshold matrices.

5. The method of claim 1, wherein the area on the currency includes at least one of a holographic image and an allochromatic ink image.

6. A method for validating currencies, comprising:
    capturing a plurality of images of an area on a currency at different angles;
    determining a plurality of characteristics of the area on each of the images;
    comparing the plurality of characteristics to a plurality of corresponding reference characteristics; and
    determining if the currency is valid based on the comparing.

7. The method of claim 6, wherein the area on the currency includes at least one of a holographic image and an allochromatic ink image.

8. The method of claim 6, wherein the determining a plurality of characteristics of the area comprises determining monochrome brightness of an outline in the area.

9. The method of claim 6, wherein the determining a plurality of characteristics of the area comprises determining RGB values of pixels in the area.

10. The method of claim 6, wherein the comparing the plurality of characteristics to a plurality of corresponding reference characteristics comprises determining differences between the plurality of characteristics and the corresponding reference characteristics.

11. The method of claim 10, wherein said determining if the currency is valid comprises determining if at least some of the differences are less than corresponding threshold values.

12. The method of claim 6, further comprising counting the currencies.

* * * * *